United States Patent [19]

Carnell et al.

[11] Patent Number: 4,887,782
[45] Date of Patent: Dec. 19, 1989

[54] CYCLIC CONTROL STICKS FOR HELICOPTERS

[75] Inventors: Brian L. Carnell, Rocky Hill; John D. Fansler, Oxford; Mukunda B. Pramanik, Burlington, all of Conn.

[73] Assignee: The United States of American as represented by the Secretary of the Army, Washington, D.C.

[21] Appl. No.: 298,073

[22] Filed: Jan. 12, 1989

[51] Int. Cl.⁴ .............................................. B64C 13/04
[52] U.S. Cl. .................................... 244/234; 74/524; 74/471 R
[58] Field of Search .............. 244/234, 220, 224, 229, 244/121; 280/775, 777; 403/381, 331, 328; 74/524, 471 R, 471 XY

[56] References Cited

U.S. PATENT DOCUMENTS

| | | | |
|---|---|---|---|
| 1,156,272 | 10/1915 | Cass | 74/524 |
| 1,806,716 | 5/1931 | Seaton | 244/229 |
| 2,008,693 | 7/1935 | Fator | 244/229 |
| 2,478,173 | 8/1949 | Austin | 244/229 |
| 3,302,478 | 2/1967 | Pauwels | 280/775 |
| 4,130,259 | 12/1978 | Carlson et al. | 244/234 |
| 4,635,327 | 1/1987 | Netzuik | 403/381 |
| 4,655,416 | 4/1987 | Carnell et al. | 244/234 |

FOREIGN PATENT DOCUMENTS 511195  6/1922  France ............................ 244/234

Primary Examiner—Galen L. Barefoot
Attorney, Agent, or Firm—Norman L. Wilson, Jr.

[57] ABSTRACT

A means for controlling a rotor of a helicopter utilizes cyclic pitch changes to its rotor blades, accomplished with a cyclic control stick. Cyclic control sticks have been a matter of concern in crashing situations. Prior art cyclic sticks are hinged to that they can be pulled out of the way of a pilot thrown forward and down by an impact. A lanyard actuated by the movement of the pilot's seat pulls the cyclic stick away from the pilot. Since such systems require various mechanisms and pulleys there is a need for an improved cyclic stick. A crashworthy cyclic control stick which is pilot actuated to overcome these difficulties is provided herein.

7 Claims, 2 Drawing Sheets

CYCLIC CONTROL STICKS FOR HELICOPTERS

FIELD OF THE INVENTION

This invention relates to cyclic control sticks for helicopters. More specifically, the invention is directed to safer cyclic sticks. Pilot impact with his cyclic stick can occur on hard, emergency or crash, landings causing severe injuries.

BACKGROUND OF THE INVENTION

A means of controlling a rotor of a helicopter utilizes cyclic pitch changes to its rotor blades. In this means, the control system changes the pitch of each helicopter rotor blade about its feathering axis once per rotor evolution. This is accomplished with a cyclic control stick. It is this stick, like the steering wheel of an automobile, that is in the pilot's way when he is thrown foward and downward in a crash.

With the adaptation of ejection seats for use in helicopters the cyclic stick became a matter of concern lest the stick strike the pilot as the pilot and his seat were leaving the aircraft and the cyclic stick remained in place. To overcome this danger, helicopters were designed with separable cyclic sticks held in place by restraining pins. Pin pullers were pyrotechnically actuated as an event of the seat ejection system.

Cyclic sticks have also been a matter of concern in crashing situations other than those involving ejection seats. Crashworthy helicopter seats which stroke downward upon impact increase rather than eliminate the danger of a pilot's chest, head or face striking the control stick of a helicopter. Carnell, et al., U.S. Pat. No. 4,655,416 describes and illustrates a prior art embodiment of a cyclic stick hinged so that it can be pulled out of the way of a pilot thrown forward and down by the impact of the crashing aircraft by a lanyard actuated by the movement of the stroking pilot's seat. In that disclosure we find a pyrotechnically energized cyclic stick repositioner, actuated by downward movement of the seat, as a means for dealing with this unresolved problem. Those means require mechanisms including pulleys and lanyards and may include a time delay before actuation. Hence, there is a need for an improved crashworthy cyclic control stick of the type provided herein.

Concerns analogous to those described above in conjunction with cyclic sticks have been reflected in automobile designs. A feature of safety automobile steering gear is the energy absorbing means provided by a steering column which yields or collapses on impact to mitigate head and chest injuries. This art is exemplified by Franchini, U.S. Pat. No. 3,556,550. The energy absorbing means in such steering gear mitigate, but do not eliminate, injuries in collisions.

The helicopter separable cyclic sticks described above have similar disadvantages. The automobile steering gear of U.S. Pat. No. 3,556,550 does yield when struck with sufficient force by the driver's body, but that technology is not translatable to helicopter control stick impact prevention because the steering gear travels a limited distance when it yields to impact, and has such inertial mass that driver injuries can only be mitigated and not prevented. A crashworthy cyclic control stick which is pilot actuated can overcome these disadvantages and is provided herein.

SUMMARY OF THE INVENTION

As indicated, this invention provides a helicopter cyclic control stick which, if impacted by a pilot at all, will minimize his injury. The upper end of the cyclic control stick is provided with a hand grip, and the control stick has its lower end mounted on pivotal fittings to provide for lateral and longitudinal pitch control. The cyclic control stick includes upper and lower control stick portions. Attachment means connect the upper stick portion to the lower stick portion. In order to disconnect the upper and lower control stick portions, release means are provided. When the upper and lower stick portions are disconnected, the upper stick portion is pulled down and away from an operator by a pretensioned spring. Along with helicopter and weapon system control switches, a pressure sensitive switch is disposed at the top of the hand grip. This pressure sensitive switch activates the release means.

BRIEF DESCRIPTION OF THE DRAWINGS

FIG. 3—3 is a view taken along section 3—3 of FIG. 3.

FIG. 4—4 is a view taken along section 4—4 of FIG. 4.

DESCRIPTION OF THE PREFERRED EMBODIMENT OF THE INVENTION

Figure 1:
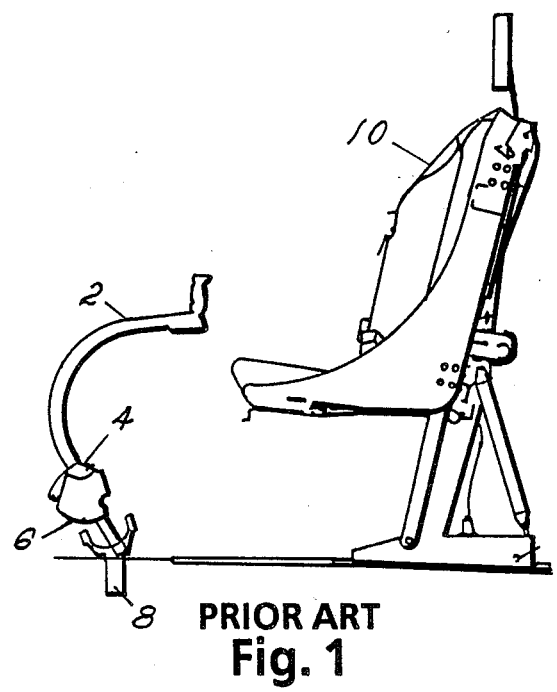
FIG. 1 is a side view of a conventional cyclic control stick showing its position relative to the pilot's seat.

Helicopter mechanical cockpit controls are generally similar regardless of make and model, and are designed to control the aircraft in its four degrees of freedom: pitch, roll, yaw (or direction), and altitude. While altitude control is often provided by a pivotable lever usually located for operation on the pilot's left-hand side and yaw control is normally provided by foot pedals, the lateral and longitudinal motions associated with pitch and roll are controlled by the cyclic stick, so named for its capability to regulate once per rotor revolution blade pitch variation. As illustrated in FIG. 1, the cyclic control stick 2 is located for convenience in front of and between the knees of the pilot. Lower end 4 of control stick 2 is mounted in pivotal fittings 6 which, through control rods 8, provide inputs to the system related servo-units of the rotor head.

Figure 2:
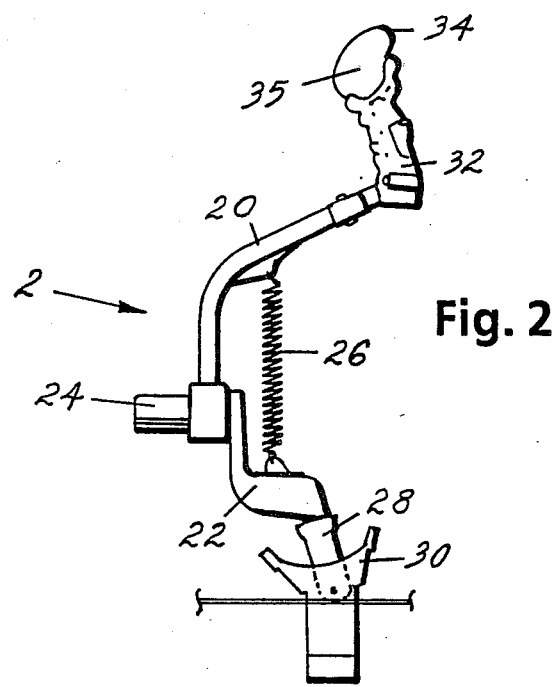
FIG. 2 is an elevation of a cyclic control stick of this invention.

The introduction of the energy absorbing seat stroking system introduced a new problem. This we learn from U.S. Pat. No. 4,655,416. FIGS. 1 and 2 in that patent graphically illustrate that a pilot in seat 10 is at great risk of being injured due to his head or chest striking the cyclic control stick as his seat descends upon impact. FIG. 2 in that patent shows the strike envelope of the pilot with his head in a line with the cyclic control stick. In U.S. Pat. No. 4,655,416 the problem was approached by use of a pyrotechnically actuated system which displaced the control stick by connecting the actuation system to the pilot seat, such that the downward stroke of the seat would initiate actuation of the cyclic stick repositioning device. An alternative actuating system is provided herein which does not rely on seat stroking movement for initiation, but relies only on the initial impact of the pilot upon a pressure sensor located at the top of the cyclic stick. By this means there is no stick realignment or disconnection at all if there is no need for it. Further, this alternative design does not necessarily rely on either an electrical or a pyrotechnic actuator, although embodiment refinements can be added using either of those systems, alone or in any combination, if so desired by the user.

A preferred embodiment of the present invention which solves the cyclic stick crashworthiness problem is illustrated in FIG. 2. This cyclic control stick 2 has a pivot end 28 attached to a pivotal fitting 30 fastened to the frame of the helicopter and provides inputs to the helicopter control mechanisms. Cyclic stick 2 includes an upper stick portion 20 and a lower stick portion 22. The upper and lower stick portions are connected by attachment means 24 which are shown in greater detail in FIGS. 3 and 4. The upper stick portion 20 contains a hand grip 32 which contains unrelated helicopter and weapon system electrical control switches, and a pad 34 which contains a pressure sensitive switch 35. The pressure sensitive switch 35 disposed in the pad 34 is thus separate from other controls and is not actuated during routine operation of the aircraft. A spring 26 is attached to both the upper stick portion 20 and the lower stick portion 22. The spring pulls the upper stick portion 20 down and away from the pilot when the upper and lower stick portions are disconnected. The spring is pretensioned to pull the upper stick portion away from the pilot at sufficient velocity to prevent serious injury to the pilot from body or head contact with the cyclic stick in a hard or crash landing. Attachment means 24 includes a release means which will be described in conjunction with FIGS. 3 and 4.

Figure 3:
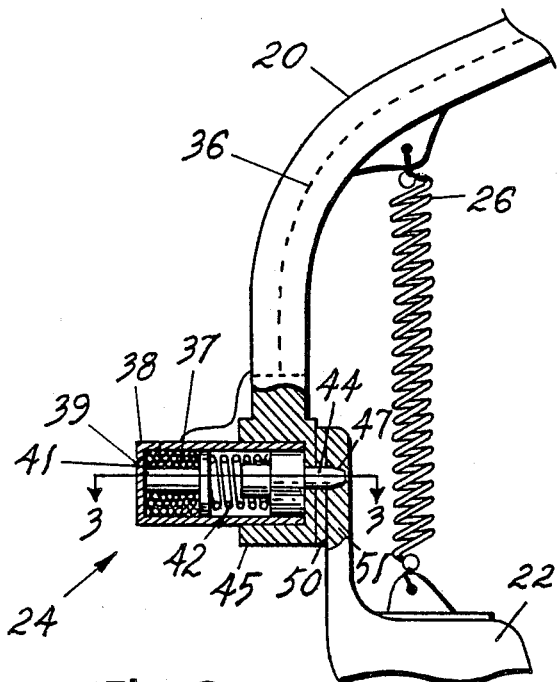
FIGS. 3 and 4 are cut-away views showing, partially in section, two embodiments of the cyclic control stick of FIG. 2.
Figure 3:
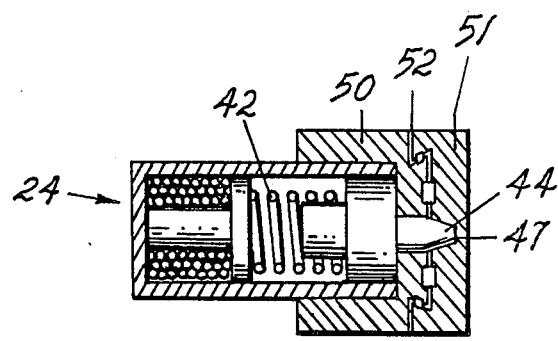

FIG. 3 shows an electrically operated release means. The source of electrical power for this release means can be independent of the aircraft's electrical system. Attachment means 24 include a stop pin 44 housed in the base 45 of the upper stick portion 20. The head of stop pin 44 passes through upper stick portion 20, and is seated in an aperture 47 in lower stick portion 22. The stop pin is held in aperture 47 by a spring 42. The upper and lower stick portions 20 and 22 are otherwise joined together for lateral restraint by vertical sliding and interlocking surfaces 50 and 51 as typically illustrated in FIG. 3-3 and 4-4. Any convenient mechanical configuration preventing lateral relative motion between the two stick portions can be utilized in conjunction with the vertical restraint provided by the pin.

Through an electrical wire 36, switch 35 actuates coil 37 of solenoid 38, which is energized by means not shown through lead lines 39 and 41. When the pressure switch in the pad 34 atop the hand grip 32 is depressed by the pilot's head or chest, the coil is energized and solenoid 38 withdraws the stop pin from the aperture 47 in lower stick portion 22. This releases the attachment between the two stick portions so that the upper stick portion 20 can then be rapidly pulled away from the pilot's head or chest by spring means 26, and allows the upper stick portion 20 to become a free body. Further contact by the pilot's head or chest with the top of the stick should not result in further injury inasmuch as the stick has then been released and is being accelerated by the spring in the same direction and at greater velocity than the downward-descending pilot's head or chest. The pad 34 atop the stick is an important element in this delethalization system in that it will act as a cushion or energy absorber. The time and action sequence between the pad 34 cushioning, the activation of switch 35 and the force required to effect such activation, the preload to be applied to spring 26, the friction to overcome in disconnecting the stick portions, the velocity of the stroking seat and its pilot, and the anticipated velocity of this head striking the pad 34, can all be tuned and designed to form a completely integrated system.

Figure 4:
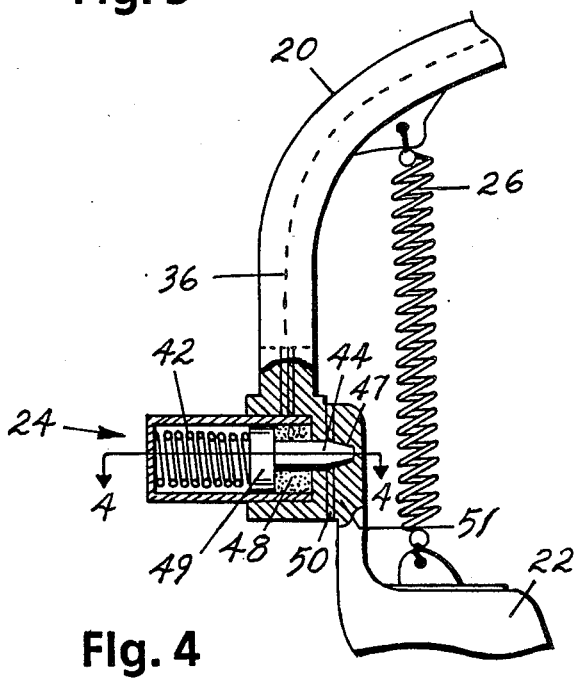
Figure 4:
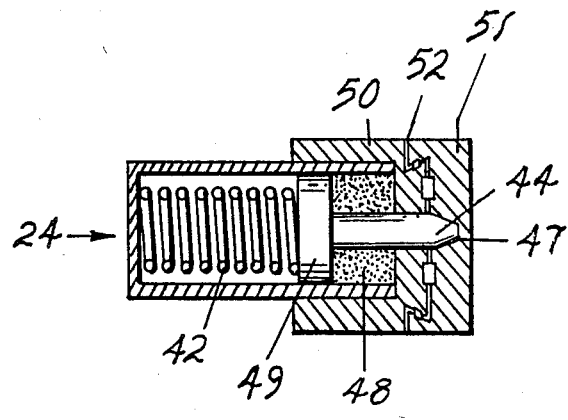

FIG. 4 shows a desirable release mechanism for the stop pin 44. Stop pin 44 is inserted through a hole in the upper stick assembly 20 and into aperture 47 in lower stick portion 22 as described in conjunction with FIG. 3. The stop pin 44 is again held in place by a spring 42. In this embodiment a pyrotechnic charge 48 is packed around the head of the stop pin 44 and housed in the base of upper stick portion 20. A pyrotechnic charge is the release means in this variation. One end of an electrically conductive wire 36 in upper stick portion 20 is attached to the pressure switch 35 lodged in pad 34. The other end of wire 36 is provided with leads embedded in pyrotechnic charge 48 in the base of upper stick portion 20. When the pressure switch is closed by the pilot an electrical impulse is conveyed through the wire 36 to initiate combustion of charge 48, thus applying a force against cylindrical portion 49, driving the stop pin out of the aperture and disconnecting the two stick portions so that spring means 26 can similarly pull the upper stick portion out of engagement. The source of electrical power for this alternative release mechanism can be independent of the aircraft's electrical system, also.

While FIGS. 3 and 4 illustrate respectively a fully electrical and an electrical/pyrotechnic system for switching and actuating the release mechanism, it should be realized that within the teachings of this invention, a number of other systems and configurations can be utilized, including mechanical or electromechanical systems, based on the particular user preferences or design specifications. Various detents can be used at the junction of the upper and lower stick portions wherein the downward force required for detent separation can be delicately balanced by the pretensioned spring force ready to pull the two portions vertically out of engagement. An entire mechanical system requiring neither electric not pyrotechnic power can be provided wherein a sheathed push-pull control rod or cable can be housed in the upper stick portion 20 leading to the release mechanism. A downward force applied to a pressure sensitive button located in the pad 34 can suffice to release the aforementioned detent connecting the stick portions. As an alternative to a ball type detent mechanism it is also possible to use a small shear pin, or roll pin. Likewise, the electric charge mentioned in conjunction with the embodiment of FIG. 4 could be replaced by a very small pyrotechnic initiator in the pad 34. Further still, a combination of mechanical/pyrotechnic elements can be used, with the push-pull rod button in the pad 34 being associated with a pyrotechnic element in the release mechanism as is illustrated in FIG. 4. In designing the specifics of a delethalization system various factors, including power sources and materials, influence the configuration chosen. It is a primary object of this invention to present sufficient teaching for selection of a simple and quite passive injury minimization system comprising uncomplicated and easily retrofitted components at low implementation costs.

It can be seen that the pretensioned spring means in the various embodiments of the present invention reduce the effects of the inertial mass of the upper stick portion of the cyclic control stick so that the upper portion can be pulled down and away from the pilot's head or upper body with minimum contact. In some of its forms the present invention has the further advantage that the sticks can be reassembled in the field after being disconnected, thus avoiding the need for spare parts or a new stick. Various ramifications of the invention have been described. Others will occur to those skilled in the art. Such modifications are, therefore, deemed to be within the scope of the invention.

What is claimed is:

1. A helicopter cyclic control stick capable of controlling the pitch of a helicopter rotor blade for reducing injuries caused by pilot impact with his cyclic stick on hard emergency or crash landings, comprising an upper control stick portion and a lower control stick portion, a hand grip on one end of the upper control stick portion, pivotal fittings on one end of the lower control stick portion connecting the control stick to cyclic pitch control mechanisms of the helicopter to allow for pilot imposed cyclic pitch motion changes, attachment means connecting one end of the upper control stick portion to one end of the lower control stick portion, release means associated with the attachment means, the release means when actuated, being capable of completely disconnecting the upper control stick portion from the lower control stick portion at the point where the attachment means join one end of each portion, pretensioned spring means having one end attached to a point on the upper control stick portion and the other end attached to a point on the lower control stick portion, the spring being biased to yank the upper control stick portion away from the pilot when the release means are actuated preventing the pilot from being injured by the control stick, a pressure sensitive switch disposed in the hand grip, and means actuated by the pressure sensitive switch for actuating the release means.

2. The helicopter cyclic control stick of claim 1 wherein the means actuated by the pressure sensitive switch for actuating the release means include means for transmitting mechanical force from the pressure sensitive switch to the release means.

3. The helicopter cyclic control stick of claim 1 wherein the means actuated by the pressure sensitive switch for actuating the release means include means for transmitting electrical energy from the pressure sensitive switch to the release means.

4. The helicopter cyclic control stick of claim 1 wherein the release means include a pyrotechnic charge and the pressure sensitive switch includes an initiator therefor.

5. The helicopter cyclic control stick of claim 1 wherein the pressure sensitive switch is an electrical switch, wherein the release means include a normally closed solenoid, the rod of the solenoid being a stop pin, and wherein the release means also include a solenoid energized by current for withdrawing the solenoid rod.

6. The helicopter cyclic control stick of claim 1 wherein the attachment means include a spring loaded stop pin inserted through apertures in the upper and lower control stick portions, and wherein the release means include means for withdrawing the stop pin from the apertures.

7. The helicopter cyclic control stick of claim 6 wherein the means actuated by the pressure sensitive switch for actuating the release means include means for transmitting mechanical force from the pressure sensitive switch to the release means.

* * * * *